Nov. 28, 1933.  A. M. BARRETT ET AL  1,936,575
METHOD OF AND APPARATUS FOR MAKING CHIP ICE
Filed Dec. 4, 1931  4 Sheets-Sheet 1
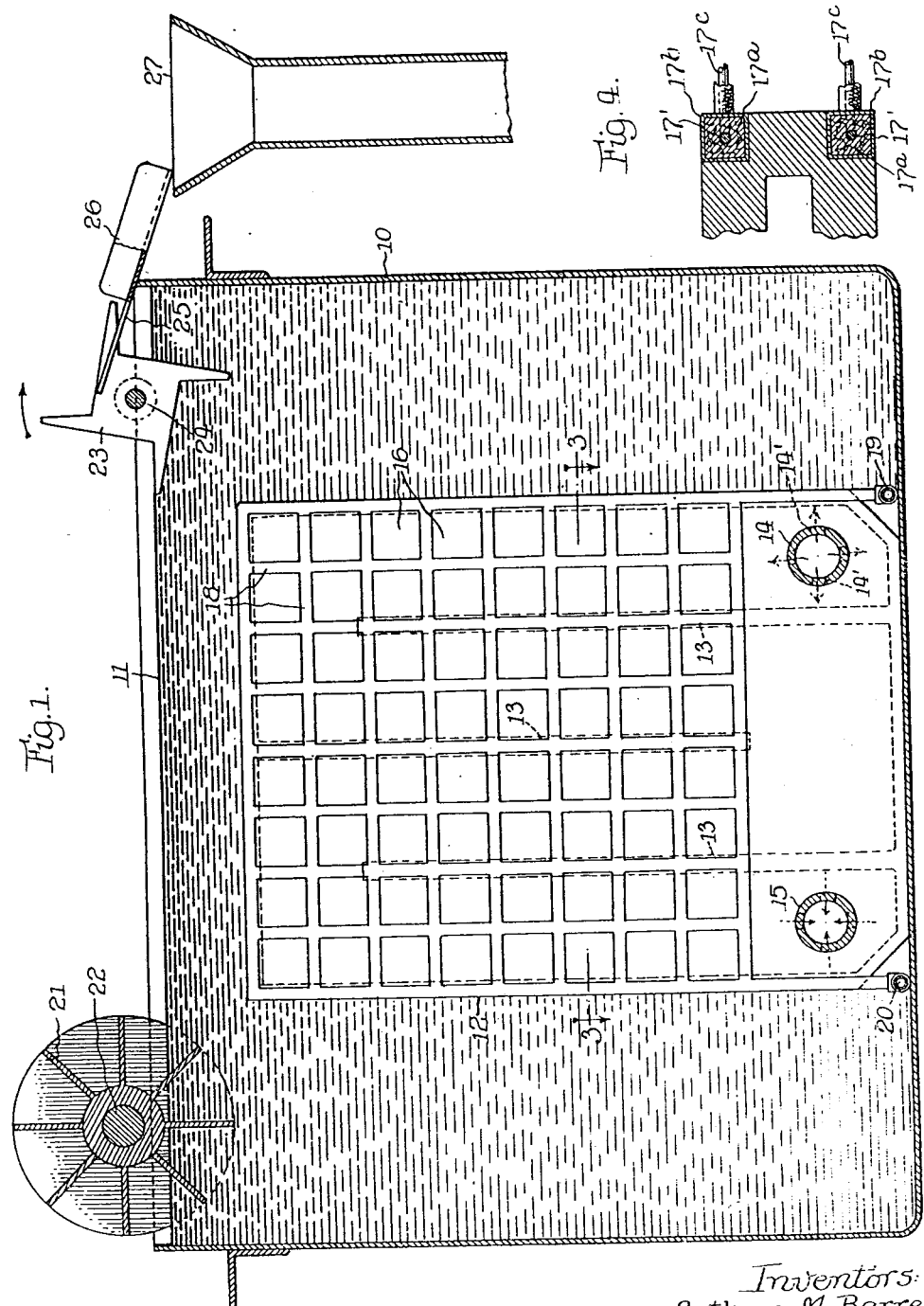
Inventors:
Arthur M. Barrett,
Louis N. Udell,
By Fisher, Clapp, Soans & Pond, Attys.

Nov. 28, 1933.  A. M. BARRETT ET AL  1,936,575
METHOD OF AND APPARATUS FOR MAKING CHIP ICE
Filed Dec. 4, 1931   4 Sheets-Sheet 2
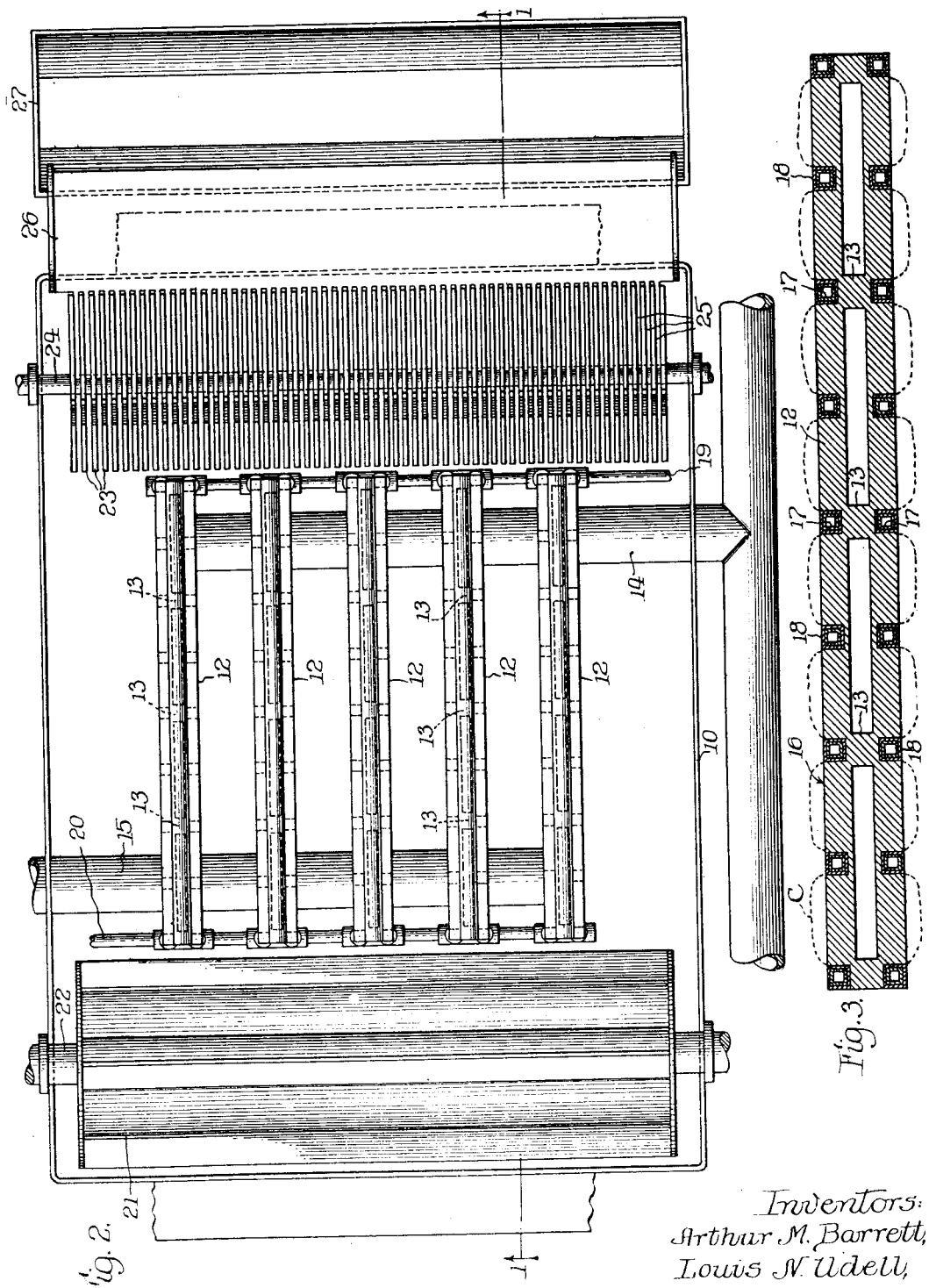
Inventors:
Arthur M. Barrett,
Louis N. Udell,
By Fisher, Clapp, Soans & Pond, Attys.

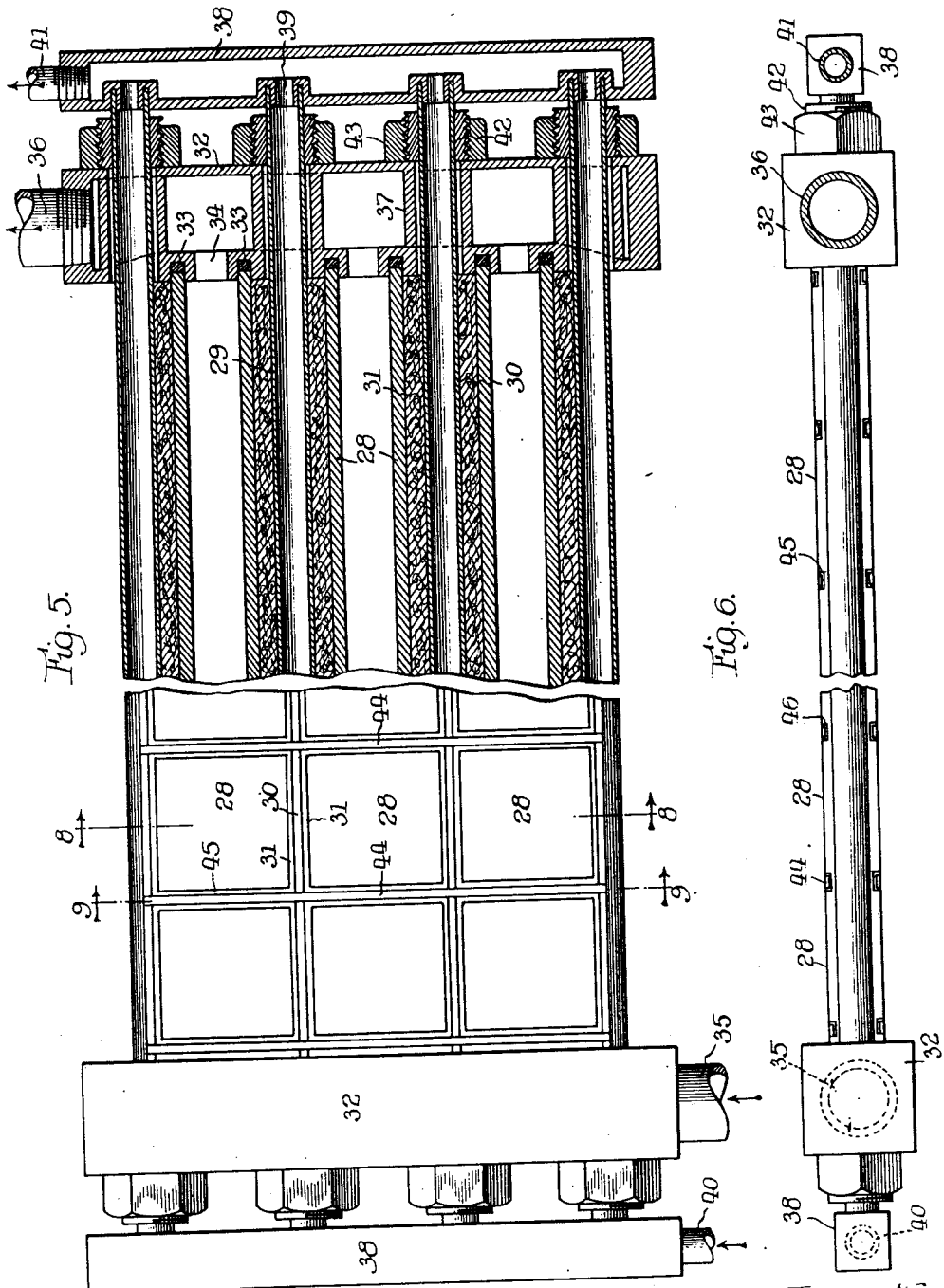

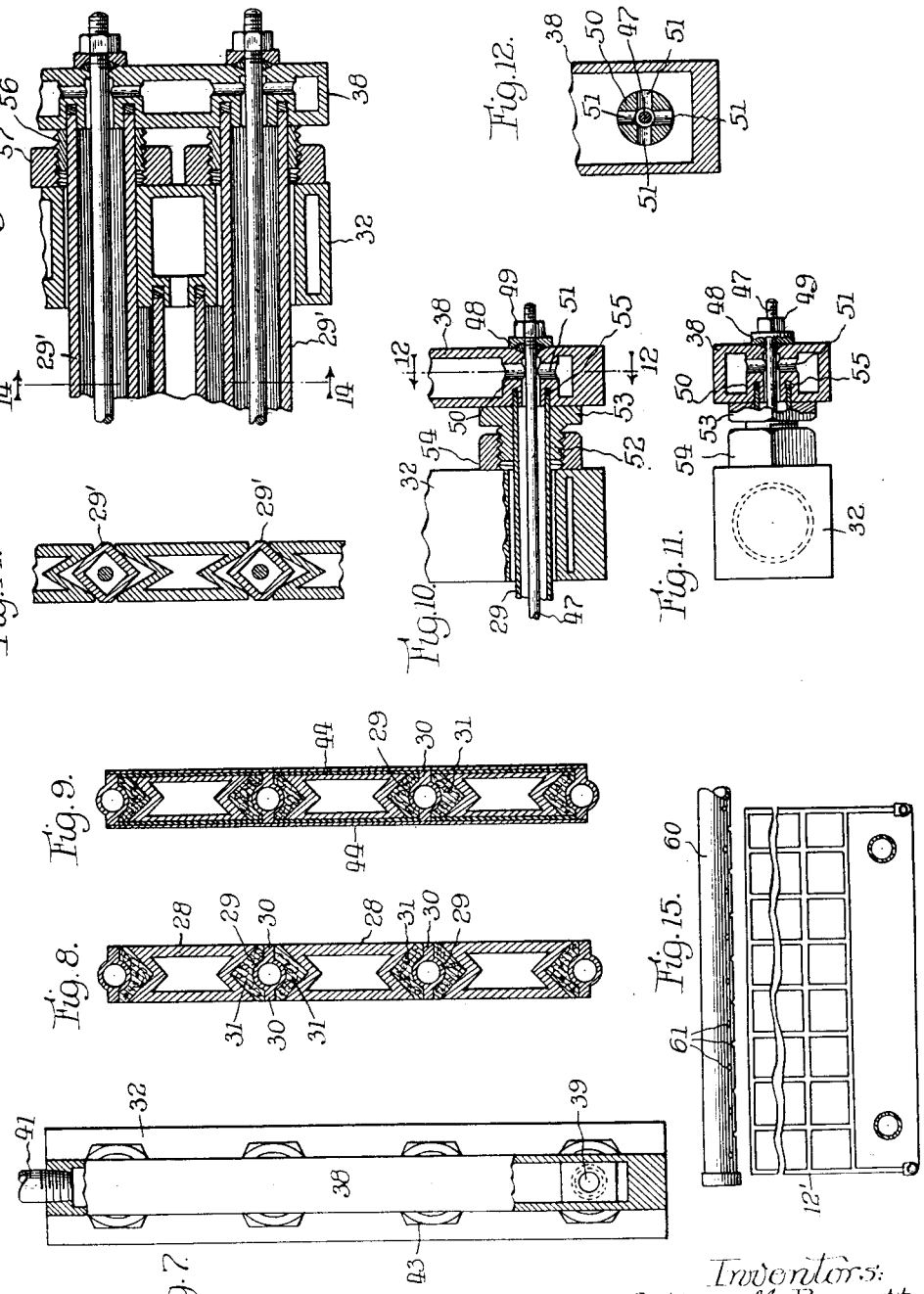

Patented Nov. 28, 1933

1,936,575

UNITED STATES PATENT OFFICE 1,936,575

METHOD OF AND APPARATUS FOR MAKING CHIP ICE

Arthur M. Barrett and Louis N. Udell, Chicago, Ill.

Application December 4, 1931. Serial No. 578,922

23 Claims. (Cl. 62—164)

This invention relates to ice freezing apparatus of the so-called "plate" type, which, generally described, consists of a hollow plate through which the refrigerating or freezing medium is circulated, causing the ice to freeze on the outer surface or surfaces of the plate. When the ice has formed to the desired thickness, a warming or thawing medium is then circulated through the hollow plate or the plate is otherwise heated to free the slabs or blocks of ice formed on the plate and cause them to separate from the latter.

It has been and still is almost universal practice to freeze ice for the general trade in the form of comparatively large blocks, slabs or cakes, so that the consuming public is obliged to crush, break, cut or otherwise reduce the ice to a more finely divided state.

The principal object of our present invention is to produce a clear, pure ice in chip form of substantially uniform size and shape ready to use for all purposes, but more especially for that portion of the trade requiring, in its ultimate use, ice in a comparatively finely divided form. Present methods of crushing result in considerable waste and consumption of labor and mechanical power.

In accordance with our present invention, we preferably employ a hollow plate that may be submerged in the water to be frozen, contained in a suitable tank, or may be bathed by water flowing over the same; and one or both surfaces of the hollow plate are divided by heating strips preferably disposed in intersecting criss-cross arrangement, whereby there are formed a plurality of relatively small freezing surface areas, preferably of uniform size and shape, on which the surrounding water congeals in the form of chips of ice. The freezing is effected by circulating a freezing medium through the hollow plate for a sufficient length of time to freeze chips of the desired thickness. At the same time, a heating medium is supplied to the heating strips, which maintains the narrow lines or spaces between the freezing surfaces at a non-freezing temperature, so that the individual chips formed on the freezing surfaces are substantially disconnected and isolated from each other. After the chips have been frozen to the desired thickness, the supply of refrigerating medium is cut off, and a thawing medium is circulated through the hollow plate, which causes the chips to fall away from the latter and, where the plate is submerged, rise by flotation to the top of the water in the tank. Means are preferably provided for causing these floating chips to move toward a pick-up device by which they are skimmed off and delivered to a discharge chute.

Several forms of apparatus well adapted to carry out the present invention are illustrated in the accompanying drawings, in which—

Fig. 1 is a vertical longitudinal section on the line 1—1 of Fig. 2, through one form of apparatus, with one of the hollow plates shown therein in elevation.

Fig. 2 is a top plan view of the parts shown in Fig. 1.

Fig. 3 is an enlarged horizontal section through the hollow plate, taken on the line 3—3 of Fig. 1.

Fig. 4 is a fragmentary view, illustrating a modification of the strip of heating means.

Fig. 5 is an elevation, partly in vertical section and broken out between its ends, of a modified form of freezing unit.

Fig. 6 is a top plan view of Fig. 5.

Fig. 7 is an end elevation of Fig. 5.

Figs. 8 and 9 are vertical transverse sections on the lines 8—8 and 9—9, respectively, of Fig. 5.

Figs. 10, 11 and 12 show a slight modification of the structure of Figs. 5 to 9 inclusive, wherein tie rods are employed for bonding the headers to the hollow freezing slabs of the structure, Fig. 10 being a vertical section of one lower corner, Fig. 11 a bottom plan view of the same, partly in section, and Fig. 12 a vertical section on the line 12—12 of Fig. 10.

Figs. 13 and 14 illustrate a slight modification of the structure of Figs. 10, 11 and 12, employing tubes of polygonal cross section in lieu of round tubes.

Fig. 15 is a side elevation, on a reduced scale, of a form of the invention wherein the water to be frozen is flowed over the freezing unit.

Referring first to the form of the invention illustrated in Figs. 1 to 4, inclusive, 10 designates a water tight tank which, in practice, is filled with water to be frozen up to approximately the level indicated by the line 11. Within and supported on the bottom wall of the tank is the chip-freezing equipment herein shown as comprising a plurality of similar hollow plates 12, each of which forms a complete chip-freezing unit, a number of said plates disposed in parallel relation being preferably employed for the sake of economical production in large quantities. The cross sectional form of these plates is best illustrated in Fig. 3, wherein it will be seen that the interior of the plate is preferably divided by transverse partitions 13 to form a plurality of connected flow passages for the freezing medium and for the subsequently used thawing medium. As shown in Fig. 1, alternate partitions 13 terminate below the top of the hollow plate, while the intermediate partition or partitions terminate above the bottom wall of the plate, so that the freezing or thawing medium entering the lower end of the flow passage at one end of the plate, through a pipe 14, flows up and down in zigzag fashion, passing out through a pipe 15 at the lower end of the flow passage at the other end of the plate. As shown in Fig. 2, the supply pipe 14 and the discharge pipe 15 extend through the entire series of plates, being ported to each plate, as shown at 14' and 15' in Fig. 1.

Within the two flat side walls of each plate 12 are embedded the heating strips which divide the outer surface of each wall into a plurality of relatively small chip-freezing areas. As shown in Fig. 1, these heating strips preferably comprise a group of horizontally disposed strips and a similar group of vertically disposed strips intersecting the horizontal strips, thereby producing rectangular freezing surfaces 16, each entirely bounded by the heating strips. In Figs. 1, 2 and 3, we have shown the heating strips as consisting of small tubes 17, lying slightly below the outer surface or the wall, and preferably surrounded by a heat insulating jacket 18 designed to reduce the transmission of heat to the freezing surfaces on each side, as well as to maintain the narrow surface space between adjacent freezing surfaces 16 at a temperature just sufficient to prevent the formation of ice thereon. The horizontal and vertical tubes intersect and communicate with each other, and a heating medium, such as a warm fluid, preferably brine, is supplied to the tubes 17 at one end of the series of hollow plates through a pipe 19, and is discharged from the other end of the series of plates through an outflow pipe 20. This supply of the heating medium is maintained during the ice-freezing operation, and thus prevents any bridge of ice forming between adjacent ice chips.

In lieu of using a heating medium such as warm brine, we may employ electrical heating means, as shown in Fig. 4, wherein, in place of the tubes 17, we may employ an electrical resistance wire or coil indicated at 17', embedded in an insulating body 17ᵃ and cover 17ᵇ, and supplied with current from a suitable source through a lead 17ᶜ.

In Fig. 3 we have illustrated, in dotted lines, the general form of ice chips C that form on the freezing surfaces 16. Of course, the thickness of these chips will depend partly on the efficiency of the freezing medium, and partly on the duration of the freezing operation, both of which may be regulated as desired.

As soon as the chips have formed to the desired size, the supply of freezing medium is cut off, and a thawing medium, such as warm water, is then circulated through the hollow plates by the same pipes 14 and 15, causing the chips to drop away from the plates into the water, and rise to the surface of the latter.

For discharging the formed chips from the water tank, any suitable and convenient means may be employed, but we have designed, and illustrated in Figs. 1 and 2, one simple and practical chip-discharging mechanism. This comprises a rotating paddle wheel 21 fast on a shaft 22 journaled across the top of the tank at one end of the latter, by which a gentle flow of the top portion of the water and the chips floating thereon toward the other end of the tank is maintained, and a pickup device comprising a group spaced star wheels 23 mounted on a rotary shaft 24 journaled across the other end of the tank. The points of the star wheels play through a stationary slotted plate or comb 25 that is continuous with a discharge chute 26 mounted on the upper end of one wall of the tank, to which chute the chips are delivered by the star wheels, and by which in turn they are delivered into a discharge hopper 27, through which they drop by gravity to a suitable collection box or receptacle.

In Figs. 5 to 9 inclusive we illustrate a modified form of chip-freezing unit, that comprises a plurality of superposed longitudinal hollow slabs 28, the cross sectional form of which is best illustrated in Fig. 8. Between adjacent channeled longitudinal edges of adjacent slabs are interposed tubular conductors 29 for the flow of the heating medium, each of the tubes 29 being formed with opposed longitudinal ribs 30 that extend to the planes of the outer surfaces of the hollow slabs 28. Interposed between the tubes 29 and the adjacent edges of the slabs 28 are heat insulation strips 31. Extending transversely of the ends of the hollow slabs 28 are hollow headers 32, the inner walls of which are recessed to receive the ends of the slabs, with felt or other packing 33 in the recesses to form fluid-tight joints. The inner wall of each header is also formed with apertures 34 by which the freezing liquid entering the lower end of one header through a pipe 35 flows through the several hollow slabs into the other header and may be discharged from the top of the latter through an outflow pipe 36. The end portions of the tubes 29 extend through the headers 32, preferably through tubular housing members 37 in each header, and at their ends enter annular grooves formed in the inner wall of a second hollow header 38, communicating with the interior of the latter through ports 39, whereby a heating fluid entering one of the headers 38 through an inflow pipe 40 passes through the several tubes 29 into the other header 38 and may be discharged through an outflow pipe 41. To bond the hollow slabs 28 and their headers 32 together, we may solder or otherwise secure to the projecting ends of the tubes 29 externally threaded collars 42, on which are mounted nuts 43, which latter, being turned up, force the two headers 32 onto the ends of the hollow slabs, compressing the packings 33 and securing tight joints.

The ribs 30 of the tubes 29 form the longitudinal heating strips of the unit. The transverse heating strips are preferably provided by metal strips 44 (Figs. 6 and 9) that are set in transverse grooves 45 formed in the hollow slabs 28, with channel-shaped insulation 46. Where the strips 44 cross the ribs 30 of the tubes 29, said ribs are notched to seat the strips 44, the insulation of the strips at these points being cut away. The strips 44 are made of good heat-conducting material, and they are heated by conduction from the ribs 30 of the tubes 29. There are thus formed on each surface of the chip-freezing unit rectangular chip-freezing surfaces similar to those shown and described in Fig. 1, each bounded by a warming strip maintained at a sufficiently high temperature to prevent the freezing of ice thereon, and thus maintaining the isolation or separation of the chips.

The cycle of operations with this last described equipment is the same as that of the equipment shown in Figs. 1 to 4 inclusive.

The slight modifications illustrated in Figs. 10 to 12 inclusive and in Figs. 13 and 14 are merely modifications in the header bonding means. In Figs. 10 to 12 inclusive we have illustrated the use of tie rods 47 extending through the tubes 29 and through the headers 32 and 38, and equipped with washers 48 and nuts 49 for securely bonding the headers, hollow slabs and tubes together. The end portions of the tie rods pass through hollow bridges 50 in the headers 38, with clearance, and said bridges are radially ported to the interior of the header, as shown at 51, to permit the ready flow of the heating medium through the tubes and headers. On each tube 29, between the headers 32 and 38, is mounted an externally threaded sleeve 52 provided with a hexagon head 53, and on the sleeve 52 is a hexagon nut 54. By turning the nut 54 and the hexagon head 53 of the sleeve 52 in opposite directions, the headers are properly spaced, and by then turning up the nuts 49, the headers 32 are forced hard onto the ends of the hollow slabs 28. It will also be observed from Figs. 10 and 11 that the ends of the tubes 29 enter annular grooves in the bridges 50, seating against packing 55 in said grooves, thereby providing a fluid-tight joint between the tubes 29 and the headers 38.

The construction shown in Figs. 13 and 14 is closely similar to that of Figs. 10, 11 and 12, differing merely in that the tubes 29' are of polygonal cross section, and the header spacing means consists, in this case, simply of a threaded sleeve 56 that fits slidably on the polygonal tube 29', and a nut 57 mounted on the sleeve. Manifestly, by merely turning up the nut 57, the desired spacing of the two headers is obtained.

In Fig. 15 we illustrate a form of the invention wherein the freezing unit 12', which may be similar to any of the freezing units above described, instead of being submerged in water in a tank, underlies a horizontal pipe 60 formed with jet apertures 61 in its lower side, whereby water supplied to said pipe flows downwardly over the sides of the freezing unit and is congealed on the freezing areas thereof, somewhat on the principle of icicle formation.

We are aware that it has heretofore been proposed to freeze water in the form of ice chips on the surfaces of a hollow plate containing a freezing medium, the outer surfaces of the plate being divided by intersecting wooden strips attached thereto so as to form a plurality of shallow cups on the surface of the plate, in which cups the chips are frozen, the purpose of the wooden division strips being to maintain the separation of the chips during the freezing operation. In practice, such wooden division strips are very inefficient and unsatisfactory, mainly for the reason that, although wood is a poorer conductor of heat than the metals, nevertheless, after a short period of operation the wooden division strips will acquire a freezing temperature from the freezing medium within the hollow plate, aided by the nearly freezing temperature of the surrounding water, and films of ice will form thereon which act as bridges connecting the chips in adjacent pockets. Our invention provides between the freezing surfaces division strips which, being positively heated, afford complete control, preventing, so far as may be desired, the formation of ice thereon, and do not depend upon the heat insulating quality of any material.

The term "chip ice" used herein is not employed in any limiting sense, but only as descriptive of the divided form in which the product is made and its preferred characteristic and utility as a substitute for ordinary crushed ice, and without any limitation as to the size or shape of the particles.

We have herein shown and described several practical forms or embodiments of the principle of our invention, all well adapted to effectuate the stated purposes and objects thereof. But believing ourselves to be the first to make ice in chip, or other comparatively fine form, by freezing water on a surface that is divided into a plurality of small freezing areas by narrow heating strips surrounding and separating said areas and maintained at a non-freezing temperature, we do not limit the invention to the particular embodiments thereof herein presented for purposes of illustration and compliance with the patent statutes, but reserve all such variations, modifications and mechanical equivalents as fall within the spirit and purview of the appended claims.

We claim:

1. In apparatus for making chip ice, a freezing unit consisting of a hollow body of heat-conducting material, means for passing a freezing medium through the interior of said body, heating strips embedded in a wall of said body and dividing said wall into a plurality of freezing surfaces bounded by said heating strips, and means for passing a heating medium through said strips.

2. In apparatus for making ice, a freezing unit consisting of a hollow body of heat conducting material formed with grooves in a wall thereof, means for passing a freezing medium through the interior of said body, heating strips in said grooves dividing said wall into a plurality of freezing surfaces bounded by said heating strips, heat-insulating strips between said heating strips and the walls of said grooves, and means for passing a heating medium through said strips.

3. In apparatus for making chip ice, a freezing unit consisting of a hollow plate of heat-conducting material, partitions forming a zigzag flow passage through said plate, means for passing a freezing medium through said passage, heating strips embedded in the opposite walls of said plate and dividing each of said walls into a plurality of freezing surfaces bounded by said heating strips, and means for passing a heating medium through said strips.

4. In apparatus for making ice, a freezing unit consisting of a hollow plate of heat-conducting material formed with grooves in opposite walls thereof, partitions forming a zigzag flow passage through said plate, means for passing a freezing medium through said passage, heating strips in said grooves dividing said walls into a plurality of freezing surfaces bounded by said heating strips, heat-insulating strips between said heating strips and the walls of said grooves, and means for passing a heating medium through said strips.

5. In apparatus for making chip ice, a freezing unit consisting of a plurality of hollow slabs disposed edge to edge, hollow headers mounted on the ends of said slabs and communicating with the interior of the latter, tubes interposed between adjacent edges of adjacent slabs, heat-insulating strips between said tubes and the adjacent edges of said slabs, hollow headers mounted on and communicating with the ends of said tubes, means for passing a freezing medium through said first-named headers and slabs, and means for passing a heating medium through said tubes and last-named headers.

6. In apparatus for making chip ice, a freezing unit consisting of a plurality of hollow slabs disposed edge to edge and formed with transverse grooves in their outer surfaces, hollow headers mounted on the ends of said slabs and communicating with the interior of the latter, tubes interposed between adjacent edges of adjacent slabs and formed with longitudinal ribs extending flush with the outer surfaces of said slabs, heat-insulating strips between said tubes and the adjacent edges of said slabs, transverse metal strips occupying the grooves of said slabs and intersecting said ribs, hollow headers mounted on and communicating with the ends of said tubes, means for passing a freezing medium through said first-named headers and slabs, and means for passing a heating medium through said tubes and last-named headers.

7. In apparatus for making chip ice, a freezing unit consisting of a plurality of hollow slabs disposed edge to edge and formed with transverse grooves in their outer surfaces, hollow headers mounted on the ends of said slabs and communicating with the interior of the latter, tubes interposed between adjacent edges of adjacent slabs and formed with longitudinal ribs extending flush with the outer surfaces of said slabs, heat-insulating strips between said tubes and the adjacent edges of said slabs, transverse metal strips occupying the grooves of said slabs and intersecting said ribs, hollow headers mounted on and communicating with the ends of said tubes, header spacing members mounted on said tubes between said headers at each end, tie rods extending through said tubes and headers, means for passing a freezing medium through said first-named headers and slabs, and means for passing a heating medium through said tubes and last-named headers.

8. Apparatus for making chip ice, comprising, in combination, a water tank, a hollow plate in said tank, intersecting heating strips dividing a wall of said plate into a plurality of freezing surfaces, means for passing a freezing medium through said hollow plate, and means for supplying a heating medium to said heating strips.

9. Apparatus for making chip ice, comprising, in combination, a water tank, a hollow plate in said tank, heating strips embedded in a wall of said plate and dividing the latter into a plurality of freezing surfaces separated by said heating strips, means for conducting a freezing medium to the interior of said plate, and means for supplying a heating medium to said heating strips.

10. Apparatus for making chip ice, comprising, in combination, a water tank, a hollow plate in said tank, intersecting heating strips embedded in a wall of said plate and dividing the latter into a plurality of freezing surfaces each entirely surrounded by said heating strips, means for passing a freezing medium through said hollow plate, and means for supplying a heating medium to said heating strips.

11. Apparatus for making chip ice, comprising, in combination, a water tank, a vertical hollow plate in said tank, intersecting horizontal and vertical heating strips dividing each wall of said plate into a plurality of freezing surfaces, means for effecting a zigzag flow of a freezing medium through said hollow plate, and means for supplying a heating medium to said heating strips.

12. Apparatus for making chip ice, comprising, in combination, a water tank, a hollow plate in said tank, intersecting tubes embedded in a wall of said hollow plate and dividing said wall into a plurality of freezing surfaces, means for effecting a flow of a freezing medium through said hollow plate, and means for supplying a heated fluid to said tubes.

13. Apparatus for making chip ice, comprising, in combination, a water tank, a hollow plate in said tank, intersecting resistance coils embedded in a wall of said hollow plate and dividing said wall into a plurality of freezing surfaces, means for effecting a flow of a freezing medium through said hollow plate, and means for supplying electric current to said resistance coils.

14. Apparatus for making chip ice, comprising, in combination, a hollow body of heat-conducting material, means for supplying a freezing medium to the interior of said body, heating strips dividing a wall of said body into a plurality of freezing surfaces bounded by said heating strips, means for supplying a heating medium to said heating strips, and means for flowing water over said wall.

15. Apparatus for making chip ice, comprising, in combination, a hollow plate of heat-conducting material, means for passing a freezing medium through the interior of said plate, heating strips embedded in opposite walls of said plate and dividing each wall into a plurality of freezing surfaces bounded by said heating strips, means for passing a heating medium through said strips, and an apertured pipe overlying said plate adapted to deliver streams of water over the surfaces of the latter.

16. A method of making ice in chip form, which consists in placing water in contact with an external surface of a hollow heat conducting body, maintaining the interior of said body at a sub-freezing temperature, and simultaneously maintaining at a non-freezing temperature narrow portions of said external surface surrounding and isolating freezing areas of said surface.

17. A method of making ice in chip form, which consists in placing water in contact with an external surface of a hollow heat conducting body, passing a freezing medium through said hollow body, and simultaneously passing a heating medium through narrow portions of said external surface surrounding and isolating freezing areas of said surface.

18. A method of making and freeing ice in chip form, which consists in placing water in contact with an external surface of a hollow heat-conducting body, maintaining the interior of said body at a sub-freezing temperature, simultaneously maintaining at a non-freezing temperature narrow portions of said external surface surrounding and isolating freezing areas of said surface, and subsequently heating the interior of said body to free the chips frozen on said freezing areas.

19. A method of making and freeing ice in chip form, which consists in placing water in contact with an external surface of a hollow heat-conducting body, passing a freezing medium through said hollow body, simultaneously passing a heating medium through narrow portions of said external surface surrounding and isolating freezing areas of said surface, and subsequently passing a thawing medium through the interior of said body to free the chips frozen on said freezing areas.

20. A method of making and collecting ice in chip form, which consists in submerging in a body of water a hollow heat-conducting body, maintaining the interior of said body at a sub-freezing temperature and simultaneously maintaining at a non-freezing temperature narrow portions of an external surface of said heat-conducting body surrounding and isolating freezing areas of said surface, subsequently heating the interior of said body to free the chips frozen on said freezing areas, and skimming off the freed chips floating on the surface of said body of water.

21. A method of making ice in chip form, which consists in flowing water over an external surface of a hollow heat-conducting body, maintaining the interior of said body at a sub-freezing temperature during such flowing operation, and simultaneously maintaining at a non-freezing temperature narrow portions of said external surface surrounding and isolating freezing areas of said surface.

22. A method of making and freeing ice in chip form, which consists in flowing water over an external surface of a hollow heat-conducting body, passing a freezing medium through said hollow body during such flowing operation, simultaneously maintaining at a non-freezing temperature narrow portions of said external surface surrounding and isolating freezing areas of said surface, and subsequently passing a thawing medium through the interior of said body to free the chips frozen on said freezing areas.

23. A method of making and freeing ice, which consists in simultaneously flowing a freezing fluid and a thawing fluid through alternate and substantially adjacent elements immersed in a body of water, and then flowing a warm medium through both series of elements to free the ice therefrom.

ARTHUR M. BARRETT.
LOUIS N. UDELL.